US006203953B1

(12) United States Patent
Dalal

(10) Patent No.: US 6,203,953 B1
(45) Date of Patent: *Mar. 20, 2001

(54) METHOD FOR FORMING A TONER IMAGE WITH LOW TONER PILE HEIGHT

(75) Inventor: Edul N. Dalal, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,117

(22) Filed: Nov. 10, 1999

(51) Int. Cl.[7] ................................................. G03G 13/01
(52) U.S. Cl. ............................................. 430/47; 430/45
(58) Field of Search .......................................... 430/45, 47

(56) References Cited

U.S. PATENT DOCUMENTS

| 5,337,136 | 8/1994 | Knapp et al. | 399/299 |
| 5,541,029 | * 7/1996 | Iwata et al. | 430/45 |
| 5,807,652 | 9/1998 | Kovacs | 430/42 |
| 5,837,408 | 11/1998 | Parker et al. | 430/42 |
| 5,895,738 | 4/1999 | Parker et al. | 430/42 |
| 5,999,201 | * 12/1999 | Dalal et al. | 430/42 |

* cited by examiner

Primary Examiner—Roland Martin
(74) Attorney, Agent, or Firm—Lloyd F. Bean, II

(57) ABSTRACT

A method to form a seven-color CMYKRGB or eight-color CMYKRGBW image having reduced toner pile height than in conventional four-color xerography, resulting in more uniform image gloss. The method includes the steps of: forming first spot next to spot toner images by placing spots of toner of a first color next to spots of toner of a second color on a first photoconductive member; forming second spot next to spot toner images by placing spots of toner of a third color next to spots of toner of a four color a second photoconductive member, and transferring said first and second spot next to spot images to form a composite spot next to spot image on an intermediate imaging member.

7 Claims, 3 Drawing Sheets

METHOD FOR FORMING A TONER IMAGE WITH LOW TONER PILE HEIGHT

CROSS REFERENCE

Cross-reference is made to concurrently filed patent application, Ser. No. 09/437,120 now U.S. Pat. No. 6,167,224 entitled; A METHOD FOR APPLYING UNIFORM GLOSS OVER THE ENTIRE PRINT, by Edul N. Dalal.

BACKGROUND AND SUMMARY OF THE INVENTION

This invention relates generally to development of dry toner images wherein the resultant image on a recording sheet exhibits low toner pile height.

A typical electrostatographic printing machine (such as a photocopier, laser printer, facsimile machine or the like) employs an imaging member that is exposed to an image to be printed. Exposure of the imaging member records an electrostatic latent image on it corresponding to the informational areas contained within the image to be printed. The latent image is developed by bringing a developer material into contact therewith. The developed image recorded on the photoconductive member is transferred to a support material such as paper either directly or via an intermediate transport member. The developed image on the support material is generally subjected to heat and/or pressure to permanently fuse it thereto.

Modern electronic printers are capable of producing quite complex and interesting page images. The pages may include text, graphics, and scanned or computer-generated images. The image of a page is described as a collection of simple image components or primitives (characters, lines, bitmaps, colors). Complex pages can then be built by specifying a large number of the basic image primitives. This is done by a page description language such as PostScript. The job of the electronic printer's software is to receive, interpret and draw each of the imaging primitives for the page. The drawing or pasteurization must be done on an internal, electronic model of the page. This electronic model of the page is often constructed in a data structure called an image buffer. The data contained is in the form of an array of color values called pixels. Each pixel corresponds to a spot, which can be marked on the actual page, and the pixel's value gives the color that should be used when marking. The pixels are organized to reflect the geometric relation of their corresponding spots. They are usually ordered such as to provide easy access in the raster pattern required for marking.

Two types of developer materials are typically employed in electrostatographic printing machines. One type of developer material is known as a dry developer material and comprises toner particles or carrier granules having toner particles adhering triboelectrically thereto. Another type of developer material is a liquid developer material comprising a liquid carrier or dispersant having toner particles dispersed therein.

Development with liquid developers in full color imaging processes has many advantages, such as a texturally attractive print because there is substantially no toner height build-up, whereas full color images developed with dry toners often exhibit height build-up of the image where color areas overlap. Further, full color prints made with liquid developers can be made to have either a uniformly glossy or a uniformly matte finish, whereas uniformity of finish is difficult to achieve with powder toners because of variations in the toner pile height.

High toner pile height is a major document appearance problem for powder xerography. It is obvious to the customer not only as increased document thickness but also in other undesirable ways, such as paper curl. In addition to being an aesthetic dissatisfier, paper distortion due to curl and ripple increases the jam rate and complicates paper handling and document finishing. This is objectionable in any market, but especially in the production color printing market, which demands high-speed reliable operation and is accustomed to the look and feel of lithography.

A need exists for an electrophotographic printing machine that can produce texturally attractive color prints with substantially no height build-up employing dry developers. A simple, relatively inexpensive, and accurate approach to produce color prints in such printing systems has been a goal in the design, manufacture and use of electrophotographic printers. The need to provide accurate and inexpensive color reproduction with dry developers has become more acute, as the demand for high quality, relatively inexpensive color images and the machines that produce them have increased.

There has been provided a method to form a seven-color (CMYKRGB: cyan, magenta, yellow, black, red, green, blue) or eight-color (CMYKRGBW: cyan, magenta, yellow, black, red, green, blue, white) having reduced toner pile height than in four-color xerography, resulting in more uniform image gloss. The method includes the steps of: forming first spot next to spot toner images by placing spots of toner of a first color next to spots of toner of a second color on a first photoconductive member; forming second spot next to spot toner images by placing spots of toner of a third color next to spots of toner of a four color on a second photoconductive member, and transferring said first and second spot next to spot images to form a composite spot next to spot image on an intermediate imaging member.

DESCRIPTION OF THE PREFERRED EMBODIMENT

Figure 1:
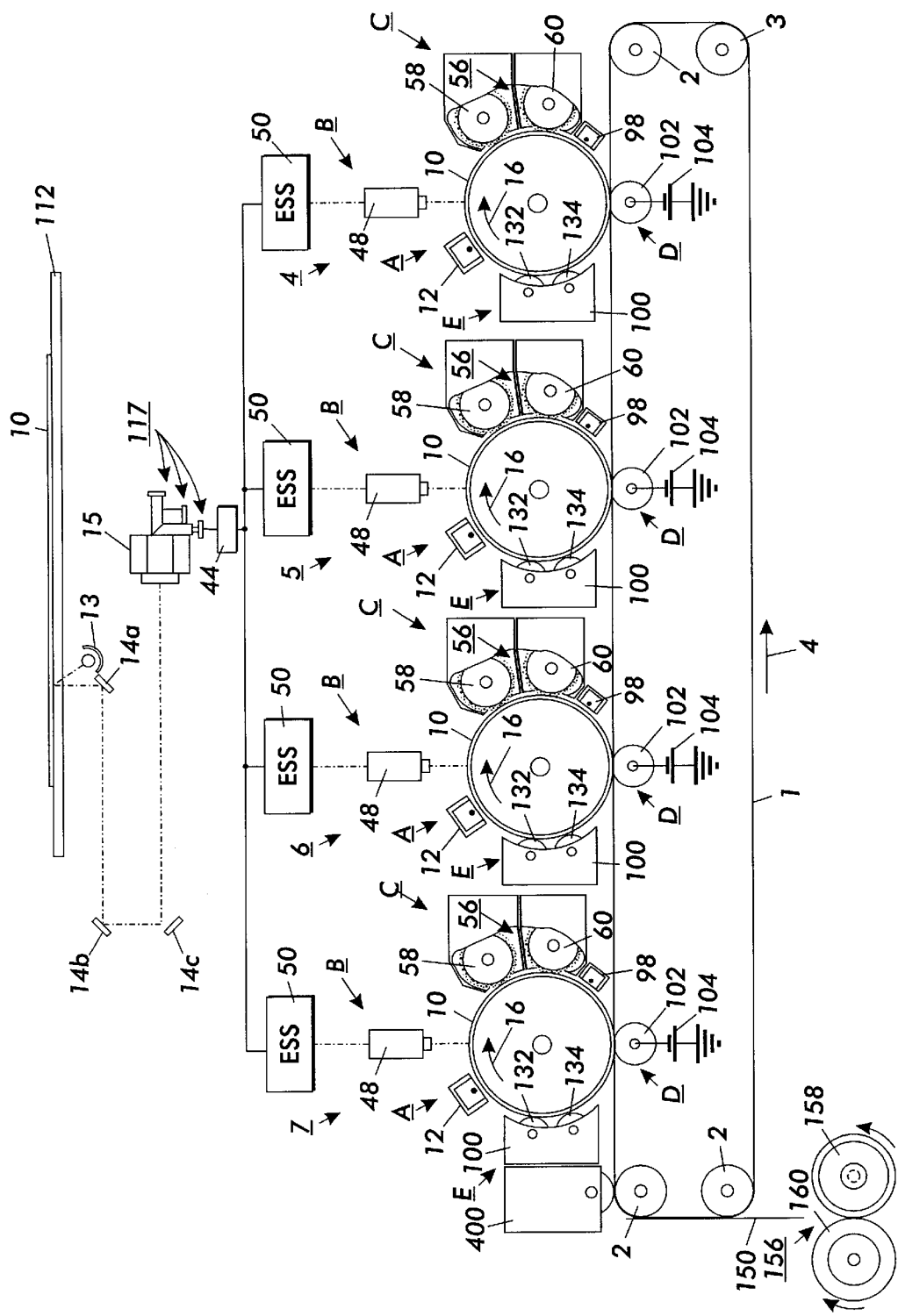
FIG. 1 is an illustration of a multicolor printing machine incorporating the present invention.

In operation of multicolor printing machine, a computer generated color image may be inputted into image processor unit 44 or a color document 10 to be copied may be placed on the surface of a transparent platen 112. A scanning assembly having a halogen or tungsten lamp 13 is used as a light source to illuminate the color document 10. The light reflected from the color document 10 is reflected by mirrors 14a, 14b and 14c, through lenses (not shown) and a dichroic prism 15 to three charged-coupled devices (CCDs) 117 where the information is read. The reflected light is separated into the three primary colors by the diachronic prism 15 and the CDs 117. Each CCD 117 outputs an analog voltage, which is proportional to the strength of the incident light. The analog signal from each CCD 117 is converted into an 8-bit digital signal for each pixel (picture element) by an analog/digital converter. The digital signal enters an image processor unit 44. The output voltage from each pixel of the CCD 117 is stored as a digital signal in the image-processing unit. The digital signal which represents the blue, green, and red density signals is converted in the image processing unit into eight bitmaps: yellow (Y), cyan (C), magenta (M), black (K), blue (B), red (R) green (G), and white (W). The bitmap represents the color value for each pixel of the image.

Figure 2:
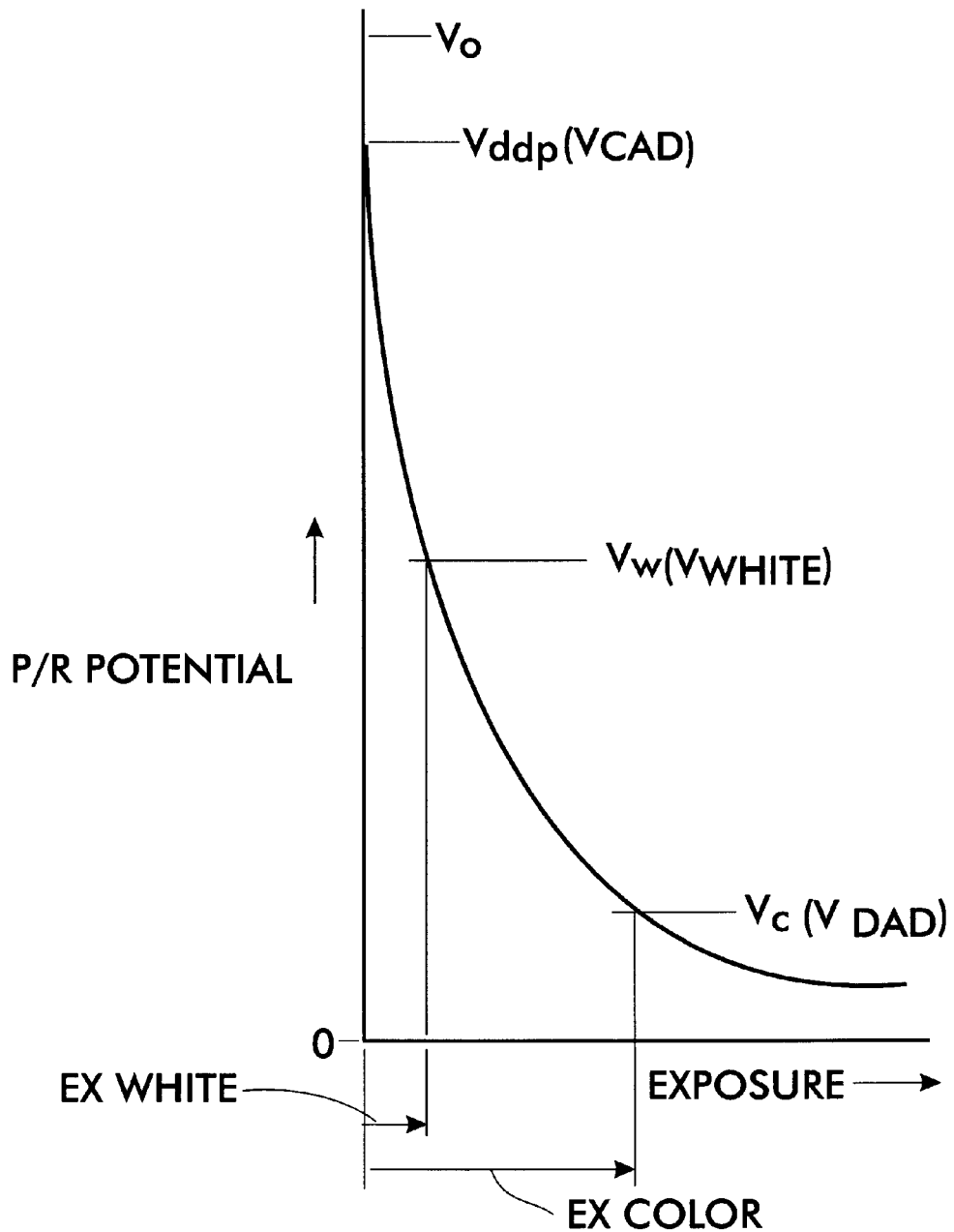
FIG. 2 is a photo induced discharge curve (PIDC) illustrating a tri-level electrostatic image.
Figure 3:
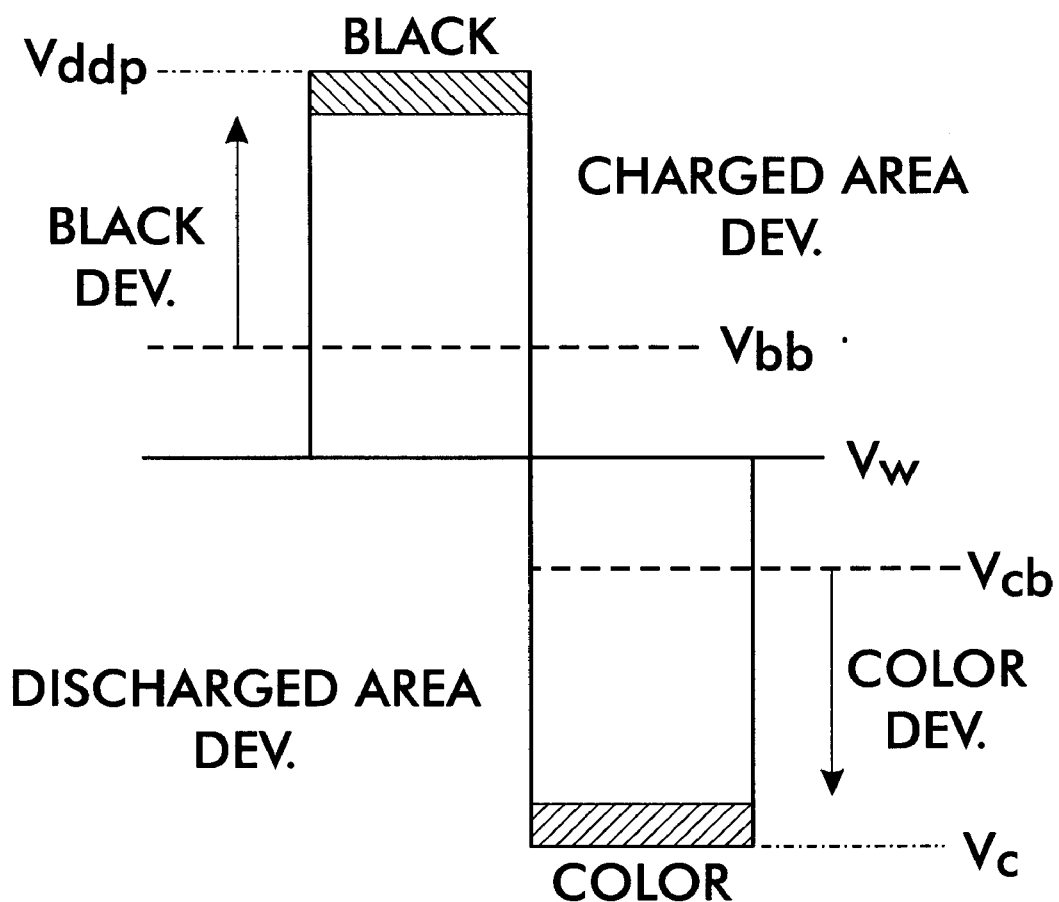
FIG. 3 is a plot of photoreceptor potentials illustrating a tri-level electrostatic image.

As illustrated in FIG. 1, the printing apparatus of the present invention comprises an intermediate belt 1 entrained about a plurality of rollers 2 and 3 which belt is adapted for movement in the direction of the arrow 4. The belt 1 is adapted to have transferred thereto a plurality of toner images which are formed using a plurality of tri-level image forming devices or engines 4, 5, 6 and 7. Each of the engines 4, 5, 6 and 7 is identical except for the color of toners associated with each of the developer units. The engine 4 comprises a charge retentive member in the form of a photoconductive drum 10 constructed in accordance with well known manufacturing techniques. The drum is supported for clockwise rotation such that its surface moves past a plurality of xerographic processing stations in sequence. As can be seen by reference to FIG. 1, initially successive portions of the drum 10 pass through charging station A. At charging station A, a corona discharge device indicated generally by the reference numeral 12, charges the drum 10 to a selectively high uniform potential, $V_0$. As noted above, the initial charge decays to a dark decay discharge voltage, $V_{ddp}$, ($V_{CAD}$). Next, the charged portions of the photoreceptor surface are advanced through an exposure station B. At exposure station B, the uniformly charged photoreceptor or charge retentive surface 10 is exposed to a laser based input and/or output scanning device 48 which causes the charge retentive surface to be discharged in accordance with the output from the scanning device. Preferably the scanning device is a three level laser Raster Output Scanner (ROS). The ROS comprises suitable optics, sensors, laser and resident control or pixel board. The inputs and outputs to and from the ROS 48 are controlled by an Electronic Subsystem (ESS) 50. The ESS also controls the synchronization of the belt movement with the engines 4, 5, 6 and 7 so that toner images to be formed spot next to spot are accurately registered with respect to previously transferred images during transfer from the latter to the former. The photoreceptor, which is initially charged to a voltage $V_0$, undergoes dark decay to a level $V_{ddp}$ or $V_{CAD}$ equal to about −900 volts to form CAD images. When exposed at the exposure station B it is discharged to $V_C$ or $V_{DAD}$ equal to about −100 volts to form a DAD image which is near zero or ground potential in parts of the image. See FIG. 2. The photoreceptor is also discharged to $V_W$ equal to approximately minus 500 volts in the background (white) areas.

At a development station C, a magnetic brush or other development system, indicated generally by the reference numeral 56 advances developer materials into contact with the electrostatic latent images on the photoconductor. The development system 56 comprises two developer units 58 and 60 having magnetic brush developer roll structures.

Each roller advances its respective developer material into contact with the latent image. Appropriate developer biasing is accomplished via power supplies not shown electrically connected to respective developer structures 58 and 60. Color discrimination in the development of the electrostatic latent image is achieved by passing the photoreceptor past the two developer structures 58 and 60 in a single pass with the rollers thereof electrically biased to voltages which are offset from the background voltage $V_{Mod}$, the direction of offset depending on the polarity of toner in the housing.

One structure, e.g. 58 in engine 4 (for the sake of illustration, the first) uses yellow developer, having triboelectric properties (i.e., negative charge) such that it is driven to the least highly charged areas at the potential $V_{DAD}$ of the latent images by the electrostatic development field ($V_{DAD}-V_{Y\ bias}$) between the photoreceptor and the development rolls of structure 58. This roll is biased using a chopped DC bias via power supply, not shown.

The triboelectric charge on conductive blue magnetic brush developer utilized by the second development structure 60 in engine 4 is chosen so that the blue toner is deposited on the parts of the latent image at the most highly charged potential $V_{CAD}$ by the electrostatic development field ($V_{CAD}-V_{B\ bias}$) existing between the photoreceptor and the development structure. This roll, like the roll of the structure 58, is also biased using a chopped DC bias. By chopped DC (CDC) bias is meant that the housing bias applied to the developer housing is alternated between two potentials, one that represents roughly the normal bias for the DAD developer, and the other that represents a bias that is considerably more negative than the normal bias, the former being identified as $V_{Bias\ Low}$ and the latter as $V_{Bias\ High}$.

The present invention employs conventional tri-level imaging as noted above, the CAD and DAD developer housing biases are set at a single value which is offset from the background voltage by approximately −100 volts. During image development, a single developer bias voltage is continuously applied to each of the developer structures. Expressed differently, the bias for each developer structure has a duty cycle of 100%. Because the composite image developed on the photoreceptor consists of both positive and negative toner, a negative pretransfer dicorotron member 98 at the pretransfer station D is provided to condition the toner for effective transfer to a substrate using positive corona discharge. At a transfer station D, an electrically biased roll 102 contacting the backside of the intermediate belt 1 serves to effect combined electrostatic and pressure transfer of toner images from the photoconductive drum of engine 4 to the belt 1.

A DC power supply 104 of suitable magnitude is provided for biasing the roll 102 to a polarity, in this case negative, so as to electrostatically attract the toner particles from the drum to the belt. After the toner images created using engine 4 are transferred from photoconductive surface of drum 10, the residual toner particles carried by the non-image areas on the photoconductive surface are removed therefrom. These particles are removed at cleaning station E. A cleaning housing 100 supports therewithin two cleaning brushes 132, 134 supported for counter-rotation with respect to the other and each supported in cleaning relationship with photoreceptor drum 10. Each brush 132, 134 is generally cylindrical in shape, with a long axis arranged generally parallel to photoreceptor drum 10, and transverse to photoreceptor movement direction. Brushes 132, 134 each have a large number of insulative fibers mounted on a base, each base respectively journaled for rotation (driving elements not shown). The brushes are typically detoned using a flicker bar and the toner so removed is transported with air moved by a vacuum source (not shown) through the gap between the housing and photoreceptor drum 10, through the insulative fibers and exhausted through a channel, not shown. A typical brush rotation speed is 1300 rpm, and the brush/photoreceptor interference is usually about 2 mm. Brushes 132, 134 beat against flicker bars (not shown) for the release of toner carried by the brushes and for effecting suitable tribo charging of the brush fibers.

Engines 5, 6 and 7 are identical to engine 4 with the exception that the developer structures thereof utilize toners of different colors. By way of example, the developer structures of engine 5 may utilize magenta developer in structure 58 and developer such as green in structure 60.

The developer structures of engine 6 may contain the third of the primary subtractive colors, cyan developer in structure 58 together with color developer in structure 60 which is a different color such as red from all the rest of the toners.

The developer structures of engine 7 may contain the fourth of the primary subtractive colors, black developer in structure 58 together with color developer in structure 58 which is a different color from all the rest of the toners such as white or a clear toner.

After all of the toner images have been transferred from the engines 4, 5, 6 and 7 the composite image is transferred to a final substrate 150 such as plain paper. The substrate 150 is then directed to a fuser device 156 comprising a heated roll member 158 and a pressure roll member 160 which cooperate to fix the composite toner image to the substrate.

As should be apparent, the toner images formed with each of the engines are effected in the spot next to spot manner, characteristic of the tri-level imaging process.

However, when transferring images to the intermediate belt 1 subsequent to the first image transfer, the transfer may be effected in a spot next to spot or spot on spot manner, depending on the input digital image. For the purpose of maximizing the color gamut the transfer would be in a spot on spot manner including combinations of up to eight colors, one or two selected from each of engines 4 5, 6, and 7. On the other hand, for the purpose of forming process color images with a minimum pile height, the transfer would be in a spot next to spot manner including combinations of up to eight colors, two selected from each of engines 4, 5, 6 and 7.

The present invention here is to use a seven-color CMYKRGB or eight-color CMYKRGBW system to produce a full color image instead of the traditional four-color CMYK. Consequently no overlaps will be necessary, and the entire image will have only a single layer of toner and therefore a maximum pile height comparable to lithography. The toner pile height will also be more uniform than in four-color xerography, resulting in more uniform image gloss.

There are several advantages to the monolayer mode of operation proposed, in addition to the obvious advantage of low and uniform toner pile height and uniform image gloss. Firstly, the toners do not need to be highly transparent, and in fact they may even be completely opaque. Thus one could use pigments which are more opaque than currently possible, and there will not be a reduction in color gamut even when using surface additives comprising large $TiO_2$ particles. Secondly, since the R, G, B toners are not constrained to subtractive mixtures of the C, M, Y toners, the most appropriate colorants can be sued. For example, the R toner can be made from the best red pigment available, which is not possible in a four-color system. Consequently, brighter colors would be achieved than in a four-color system.

A schematic illustration of this embodiment, based on trilevel xerography, is shown in FIG. 1. This is a tandem architecture suitable for high-speed production color printing. Each photoreceptor develops two separations in trilevel mode. While they may be combined in different ways, a preferable configuration is to combine them as opponent colors: C+R, M+G, Y+B, K(+W). The seven (or eight, as discussed below) color separations are thus developed onto the various photoreceptors and then transferred to a compliant intermediate belt. When all four separations have been built up on the intermediate belt, the entire image is transfixed to paper. An optional film forming station (discussed later) can be used to spread out the toner image into a thin film before is transfixed to paper.

It is seen in FIG. 1 that in this embodiment only three (R,G,B) or four (R,G,B,W) additional developer housings are needed, compared to a similar four-color xerographic system. There is no need for additional photoreceptors or ROS's.

Since there are no overlapping toners, there is no need to provide additional screen angles for the halftone screens of the additional colors (R,G,B). In fact, if desired a single screen angle can be used for the entire image.

Each separation (C,M,Y,K) in lithography has a thickness of about 1 $\mu$m, so the total ink pile height is about 4 $\mu$m. A hexagonal close packed array of uniform particles has a packing fraction of about 0.6. Since only a monolayer of toner is used, even the seven or eight toners proposed in this invention would give a total pile height of only 4 $\mu$m, comparable to lithography, if a toner size of (4/0.6)=6.5 $\mu$m were used.

Pile heights even lower than 4 $\mu$m could be achieved, or a toner size of significantly larger than 7 $\mu$m could be used, by using the toner film forming concept proposed by U.S. Ser. No. 09/004,657 now U.S. Pat. No. 5,992,201, (D/97599). An interesting feature in this case is that the film forming operation would need to be conducted only once, after all separations are deposited on the intermediate belt, rather than after each separation as proposed in the U.S. Ser. No. 09/004,657 (D/97599). This is because there is only a monolayer of toner on the intermediate belt even after all separations are deposited. An optional film forming station 400 is indicated on the schematic architecture in FIG. 1.

For very high-quality applications, such as photofinishing applications, it is desirable that all differential gloss be eliminated in the image. Although significantly reduced in the monolayer mode due to uniform toner pile height in all toned areas, differential gloss is not eliminated because of bare paper in the white areas. Differential gloss can be completely eliminated if the white areas are filled in with clear (or white) toner in an eight-color process. This can be done by adding clear toner; e.g. in a trilevel combination with black (K+W) as shown in FIG. 1. Alternatively, the flood exposure method suggested by Dalal Patent App. No. (IP/961140) could be used in either case. The result is a perfectly uniform toner pile height everywhere in the image. This results in total elimination of differential gloss. Moreover, in duplex applications, the matched low and uniform toner pile height on both sides of the page can completely eliminate curl and ripple.

If the eight-color (including W) process described above is utilized, it is not necessary to use the white toner in all images. Thus, one might use seven colors for certain images (such as text) but eight colors for others (such as pictorials). This can be handled in the image processing.

The seven (or eight) color system proposed above would have a color gamut comparable to or better than that of a conventional four-color xerographic system. An even larger gamut can be achieved if overlaps of these colors (e.g. R+Y) are allowed. Of course, this loses the advantage of low pile height. If the trilevel combinations are Y+B, M+G, C+R, K (+W) then it is possible to switch between the low-mass monolayer scheme and the high-gamut multilayer scheme by merely changing the image processing algorithms, without any changes to hardware or materials.

The present invention is described in connection with preferred embodiments; however, it will be understood that there is no intent to limit the invention to the embodiments described. On the contrary, the intent is to cover all alternatives, modifications, and equivalents as may be included within the spirit and scope of the invention as defined by the appended claims.

What is claimed is:

1. A method of forming toner images, said method including the steps of:

forming first spot next to spot toner images by placing spots of toner of a first color next to spots of toner of a second color on a first photoconductive member;

forming second spot next to spot toner images by placing spots of toner of a third color next to spots of toner of a four color a second photoconductive member; and transferring said first and second spot next to spot images to form a composite spot next to spot image on an intermediate imaging member.

2. The method according to claim 1 wherein said steps of forming first and second spot next to spot toner images comprises using tri-level imaging structures.

3. A method of forming toner images, said method comprising depositing a multiplicity of primary toner particles, such that there is substantially no overlap between any of the toner particles.

4. The method according to claim 3, wherein said multiplicity of primary toners comprise a cyan toner, a magenta toner, a yellow toner, a black toner, a red toner, a green toner and a blue toner.

5. The method according to claim 4, wherein the primary toners are deposited on a compliant intermediate member using trilevel imaging structures.

6. The method according to claim 5, wherein each trilevel imaging structure contains a pair of complementary primary toners.

7. The method according to claim 4, wherein an additional white or clear toner is included.

* * * * *